June 19, 1951          C. E. BERRY          2,557,070
LINEAR SIMULTANEOUS EQUATION SOLVER
Filed Aug. 13, 1945          2 Sheets-Sheet 1
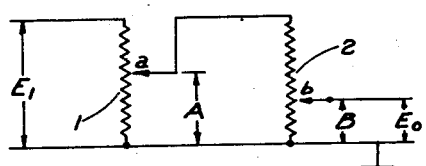
FIG-1
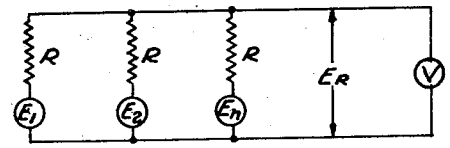
FIG-2
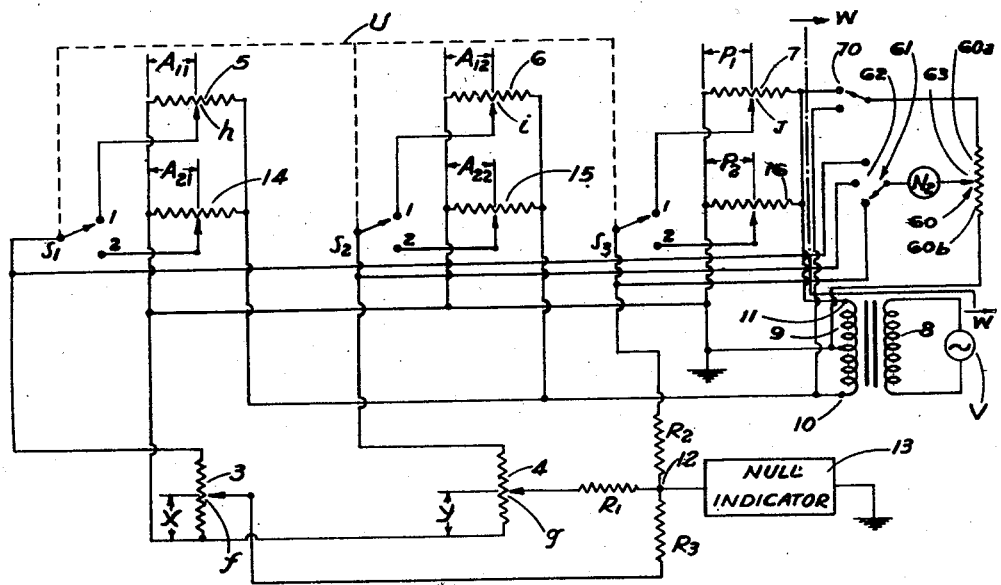
FIG-3
FIG-5
INVENTOR.
CLIFFORD E. BERRY
BY Christie & Angus
ATTORNEYS Patented June 19, 1951

2,557,070

UNITED STATES PATENT OFFICE 2,557,070

LINEAR SIMULTANEOUS EQUATION SOLVER

Clifford E. Berry, Pasadena, Calif., assignor to Consolidated Engineering Corporation, Pasadena, Calif., a corporation of California Application August 13, 1945, Serial No. 610,457

12 Claims. (Cl. 235—61)

This invention relates to electrical calculating systems and particularly to systems for ascertaining unknown quantities in mathematical equations.

The principal object of the invention is to provide a simplified electrical system by which mathematical solutions can be obtained. This application is a continuation-in-part of my copending application Serial No. 561,192, filed October 31, 1944, entitled Computer, now abandoned.

Electrical systems have heretofore been proposed for solving simultaneous mathematical equations; and these have comprised arrangements of potentiometers having electrical voltages connected across them. By setting up the known mathematical quantities on some of the potentiometers, it is possible to ascertain the unknown quantities by moving the movable arms of other potentiometers, representing the unknowns, until a condition of electrical balance is obtained in the system. Heretofore such systems have required a considerable number of voltage sources and potentiometers, making the system expensive and complicated.

According to my invention, I have overcome the disadvantages of complication in the prior known systems, and have provided a system which may be operated from a single source of voltage.

Furthermore, I need only a single potentiometer, or voltage divider, representing each mathematical quantity.

I carry out my invention by the use of "multiplying" combinations of potentiometers, or voltage dividers, and I effectively add the combinations by the use of an "addition" network arranged in accordance with a feature of my invention.

My invention and its features and advantages will be better understood from the following detailed description taken in conjunction with the accompanying drawings of which:

Fig. 1 shows a multiplying potentiometer circuit utilized in the system of my invention;

Fig. 2 shows an electrical addition circuit for adding voltages according to my invention;

Fig. 3 shows an embodiment of my invention capable of solving for two unknown quantities in two simultaneous equations;

Fig. 5 shows a general form of electrical system for performing the computations.

Figure 4:
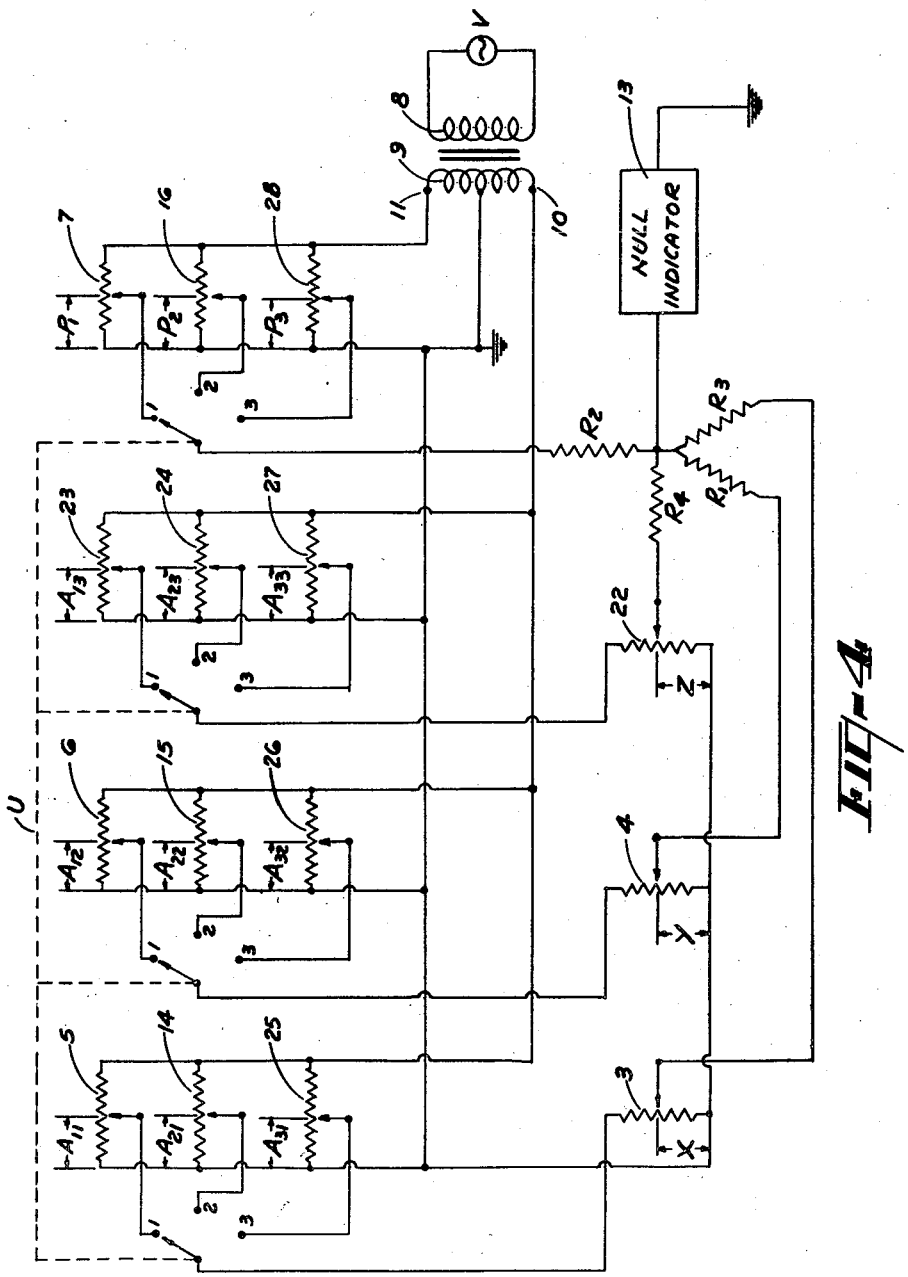
Fig. 4 shows a similar embodiment of my invention which differs from that of Fig. 3 in being capable of solving for three unknown quantities in three simultaneous equations.

My computer comprises a combination of two types of electrical circuits, one of these being a multiplying type of circuit as shown in Fig. 1, and the other being an addition circuit of the type shown in Fig. 2. Referring to Fig. 1, the multiplying circuit comprises a potentiometer, or voltage divider, $1$, having connected across its terminals a voltage $E_i$. The tap $a$ of potentiometer $1$ is connected to one terminal of a second potentiometer or voltage divider, $2$, the other terminal of which is connected with one side of potentiometer $1$, which for convenience is grounded. In this type of circuit, the output voltage $E_0$ between ground and the tap $b$ of potentiometer $2$ is given by the product equation:

$$E_0 = A \cdot B \cdot E_i$$

where A is the fraction of the total voltage across the potentiometer $1$ which is between ground and its tap $a$; and B is the fraction of the total voltage across potentiometer $2$, which is between ground and tap $b$. It is understood that the loading effect of potentiometer $2$ upon potentiometer $1$ is taken into account when setting tap $a$.

In Fig. 2 I show a type of addition circuit in which a number of voltages $E_1, E_2 \ldots E_n$ can be added, and their sum read on a suitable voltage indicator, such as the voltmeter V, as the voltage $E_R$. This addition circuit comprises $n$ parallel arms, each containing a resistance R, all of the resistances R being equal in value. The several voltages $E_1, E_2 \ldots E_n$ are connected in the respective parallel arms in series with an individual resistor R. In this type of circuit the voltage $E_R$ is given by the equation:

$$E_R = \frac{1}{n}\sum_{k=1}^{n} E_k$$

Suppose now that it is desired to solve for the two unknowns X and Y in the following simultaneous equations:

$$A_{11}X + A_{12}Y - P_1 = 0 \quad (1)$$
$$A_{21}X + A_{22}Y - P_2 = 0 \quad (2)$$

in which all of the quantities except X and Y are known. I do this according to my invention by setting up a multiplying circuit according to Fig. 1, corresponding to each of the products $A_{11}X$, $A_{12}Y$, $A_{21}X$ and $A_{22}Y$. I also set up a quantity corresponding to $P_1$ and $P_2$. These quantities and products I then add on an addition circuit like that of Fig. 2.

Fig. 3 embodies such a system adapted to solve for two such simultaneous equations. The unknown quantity X is represented by the proportion of the voltage across potentiometer $3$ which exists between ground and the tap $f$; and the unknown quantity Y is represented by the proportion of the voltage across potentiometer 4 which exists between ground and the tap $g$. The quantity $A_{11}$ is the proportion of the voltage across potentiometer 5 which exists between ground and the tap $h$. The quantity $A_{12}$ is the proportion of the voltage across potentiometer 6 which exists between ground and the tap $i$. The quantity $P_1$ is represented by the proportion of the voltage across potentiometer 7 which exists between ground and the tap $j$.

It will be observed that when switch $S_1$ is connected with its switch point 1, there is set up a multiplying circuit like that of Fig. 1 in which potentiometer 5 corresponds to potentiometer 1 in Fig. 1, and potentiometer 3 corresponds with potentiometer 2 in Fig. 1. For the purpose of supplying across potentiometer 5 a voltage corresponding to $E_1$ in Fig. 1, there is provided an alternating voltage source V connected across the primary winding 8 of a transformer T. The secondary winding 9 of the transformer is tapped at its midpoint which is grounded as shown; and the voltage across potentiometer 5 is the voltage between ground and one terminal 10 of winding 9. Now if the known quantity $A_{11}$ be set up on potentiometer 5 by proper adjustment of its movable tap $h$, the movable tap $f$ of potentiometer 3 can be adjusted to represent the quantity X, so that the combination of potentiometers 5 and 3 will represent the quantity $A_{11}X$. The other product $A_{12}Y$ may be set up in a similar manner on potentiometers 6 and 4 when switch $S_2$ is moved to its upper contact 1, as potentiometer 6 has connected across it the same voltage as potentiometer 5. To enable these potentiometer quantities to be set up, each of the equations may be multiplied by a factor which will make each quantity $A_{11}$, $A_{12}$, etc. a decimal quantity, that is a fraction of unity, in the event they are not already fractions. The potentiometer taps may then readily be adjusted to make the proportion of the voltage between ground and the tap of each potentiometer to the total voltage across the potentiometer, equal to the corresponding fraction. For example, suppose that $A_{11}$ is .50, then the tap $h$ will be set to tap off one-half of the total voltage across potentiometer 5; and if $A_{12}$ be .25, then tap $i$ will be set to tap off one-fourth of the voltage across potentiometer 6.

Potentiometer 7 has connected across it a voltage equal to that on potentiometers 5 and 6 but displaced 180° in phase due to the fact that instead of being the voltage between ground and terminal 10 on the transformer, it is the 180° phase displaced voltage between ground and the other terminal 11. The reason for thus phase displacing this voltage is that the quantity $P_1$ is measured as the proportion of the voltage across potentiometer 7 which exists between ground and tap $j$; and $P_1$ is a negative quantity in the equation.

Accordingly by adding the three quantities $A_{11}X$, $A_{12}Y$ and $-P_1$, Equation 1 is satisfied when this summation is equal to zero. To establish this, I use the addition circuit like that shown in Fig. 2. This comprises the three resistors $R_1$, $R_2$ and $R_3$ which are equal to each other and correspond to R in Fig. 2. The voltage between ground and the tap of potentiometer 3 corresponds to voltage $E_1$ in Fig. 2; the voltage between ground and the tap of potentiometer 4 corresponds to the voltage $E_2$ in Fig. 2; and the voltage between ground and the tap of potentiometer 7 corresponds to the voltage $E_n$ in Fig. 2. The sum of these three voltages will be zero when the voltage between ground and the common terminal 12 of the three resistors $R_1$, $R_2$ and $R_3$ is zero. This zero condition can be indicated by a null indicator 13. This may for example, be a suitable indicator such as a vacuum tube voltmeter or galvanometer adapted to indicate when there is zero voltage applied to it. Accordingly, after the known quantities $A_{11}$, $A_{12}$ and $P_1$ are set up on the respective potentiometers, Equation 1 will be satisfied when the taps on potentiometers 3 and 4 are so adjusted as to produce a zero indication on indicator 13. In order for the summation to be accurate according to the equation $$E_R = \frac{1}{n}\sum_{k=1}^{n} E_k$$

it is manifest that the impedance of the summation circuit resistors $R_1$, $R_2$ and $R_3$ must be relatively large compared with the impedances of potentiometers 3 and 4, so that adjustments of the taps $f$ and $g$ will not have substantial effect on the impedance in series with $R_1$, $R_2$, etc. This is apparent from Fig. 2, which is the basic circuit for this summation, wherein the impedance of the voltage sources E, $E_1$, etc. are negligible in comparison with the R resistors. I have found in practice that these source impedances are satisfactorily low if they are no greater than $\frac{1}{1000}$ of the impedances $R_1$, $R_2$, etc. If the ratio of the source impedance should come much closer than that to the R impedances, some appreciable errors might be introduced.

The selection of X and Y in Equation 1 by this initial adjustment will probably not satisfy Equation 2, however. To provide for Equation 2, I provide an additional set of potentiometers 14, 15, and 16 connected respectively in parallel with potentiometers 5, 6, and 7. The second switch point 2 of each switch $S_1$, $S_2$ and $S_3$ is connected to the respective movable taps on potentiometers 14, 15, and 16. The known quantities $A_{21}$, $A_{22}$ and $P_2$ are set up on the respective potentiometers 14, 15 and 16 in the same manner as was done for Equation 1 on potentiometers 5, 6 and 7. Now when the switches $S_1$, $S_2$ and $S_3$ are thrown to their switch points 2 by the unicontrol arrangement, the system is set up for Equation 2, although when the switches are first thrown the null indicator 13 will probably indicate some value other than zero inasmuch as the particular values of X and Y found to satisfy Equation 1 will probably not satisfy Equation 2. Accordingly, one of them, for example the quantity X, will be moved by moving the tap of potentiometer 3 until the indicator does read zero.

Then the switches $S_1$, $S_2$ and $S_3$ will be thrown to their switch points 1, again, which will now again produce a non-zero reading on the indicator. But the indicator will again be brought to a zero reading by moving the tap for quantity Y on potentiometer 4. The switches will then be thrown back to their points 2 and the indicator again brought to zero by moving the tap on potentiometer 3. Each successive switching and zeroing of the indicator will bring the potentiometers 3 and 4 more nearly to the condition where they tend to read zero for both settings of the switch. When the switches can finally be thrown from one of their points to the other without changing the zero reading, both equations are satisfied and the readings on potentiometers 3 and 4 give the values of X and Y satisfying the two equations.

The X and Y values represented by the final settings on potentiometers 3 and 4 are, as explained above, the ratios of the tapped off voltage to the total voltage across the respective potentiometers. If these potentiometers 3 and 4 are not substantially loaded, their voltage ratios will be substantially the same as the ratio of the tapped off impedance to the total potentiometer impedance. Thus if the tap $f$ is set so that the impedance of potentiometer 3 from ground to tap $f$ is .35 of the total potentiometer impedance, then the value of X is .35. The value of Y is ascertained in a similar way. It may be convenient to place an ohmic scale along each potentiometer so that the X and Y values may be indicated directly on the point of the scale where the tap is placed.

The quantities representing the known A and P values can be set up on the respective A and P potentiometers in any convenient manner. For example, if the voltage between ground and terminal 10 or 11 at the voltage source is fixed at one volt and if a voltmeter be connected between ground and each A and P potentiometer tap, the proportion of the voltage across the entire potentiometer which lies between ground and the tap can be read directly on the meter, and will be the numerical value of the A or P quantity which is set up. For example, the quantity $A_{11}$ being .5249, then this quantity can be set up on potentiometer 5 by moving tap $h$ until the voltmeter reads a .5429 volt, assuming the total voltage across the potentiometer to be one volt.

A more convenient and more accurate way of setting up the A and P quantities, however, is the arrangement shown in Fig. 3 to the right of the dotted line W—W. This Wheatstone bridge arrangement comprises the potentiometer 60 having the two bridge arms 60A and 60B separated by the tap 63 of the potentiometer. The potentiometer 60 is adapted to be connected across any of the potentiometers representing the known values, and for this purpose, one side of potentiometer 60 is grounded and the other side connected to a selector switch 70 having two contacts, one of which connects with terminal 11 and the other with terminal 10 of the transformer. A null indicator $N_2$ is connected to the tap of potentiometer 60 and the other side of the null indicator is connected to a selector switch 61 adapted to connect with any one of a series of contacts 62. Each of the selector switch contacts connects to the tap of an individual one of the potentiometers 5, 6, 7, 14, 15 and 16. Thus the other two arms of the Wheatstone bridge are composed of the portions of either side of the potentiometer tap of whichever potentiometer 5, 6, 7, 14, 15, or 16 is in circuit. By moving the tap 63 on potentiometer 60 for a null reading on indicator $N_2$, the voltage between ground and tap 63 can be immediately read on a calibrated scale which may be attached to potentiometer 60, as the voltage of tap 63 must be the same as the voltage on the tap of the A or P potentiometers for the condition of bridge balance.

The system of my invention can be used with any number of simultaneous equations and is not limited to the solution of two unknowns in two equations such as Equations 1 and 2. For example, if it is desired to solve for the unknowns X, Y and Z in the following equations:

$$A_{11}X+A_{12}Y+A_{13}Z-P_1=0 \qquad (3)$$
$$A_{21}X+A_{22}Y+A_{23}Z-P_2=0 \qquad (4)$$
$$A_{31}X+A_{32}Y+A_{33}Z-P_3=0 \qquad (5)$$

the system can be constructed as shown in Fig. 4. This differs from Fig. 3 in the addition of another potentiometer 22 corresponding to the third unknown Z and its associate resistor $R_4$, and also the corresponding parallel connected potentiometers 23 and 24. Furthermore, there is connected a third potentiometer 25 in parallel with potentiometers 5 and 14; and potentiometer 23 in parallel with potentiometers 6 and 15; and a potentiometer 24 in parallel with potentiometers 20 and 21; and a potentiometer 27 in parallel with potentiometers 23 and 24. Furthermore, the switches $S_1$, $S_2$, $S_3$ and $S_4$ have three switch points instead of two in order to switch by the uni-control U to any one of the three sets of potentiometers.

In this arrangement there are four potentiometers in a line, representing the four quantities of the equations, and there are three potentiometers 3, 4, and 22, corresponding to the three unknowns in these quantities. Moreover, there are three potentiometers in parallel in each group representing the known quantities, thereby providing a set of potentiometers for each of the three equations. It will be apparent that the system of potentiometers can be extended in this manner to any number of simultaneous equations and unknown quantities. Furthermore, it will be apparent that even though the system be enlarged in this manner to take care of three or more simultaneous equations, a lesser manner of equations can be solved for. For example, the system shown in Fig. 4, even though capable of solving for three simultaneous equations, can just as well solve for two simultaneous equations by simply using only the first two groups of voltage dividers with its switches $S_1$ and $S_2$, and making no use of the third group, with its switch $S_3$; and furthermore, making use of only switch points 1 and 2 of switches $S_1$ and $S_2$. In the same way, even though the system were to contain enough groups to solve for more than three simultaneous equations, a lesser number of equations can be solved for by using only as much of the entire system as corresponds to the smaller number of equations.

It will be apparent that the system of Fig. 4 for solving more than two equations may be operated in the same manner as was explained above for the operation of the system shown in Fig. 3. That is, the known quantities are set up on their respective potentiometers by making the tapped off voltage ratios equal to the respective numerical quantities. Then, the X and Y and Z potentiometers are successively adjusted to produce a null indication on the null indicator 13, the switches $S_1$, $S_2$, etc. being switched between each adjustment from the potentiometers for one equation to the potentiometers for the next equation. This cycle of switching and adjusting for the null indication is repeated until the ultimate values set up for X, Y and Z produce the null for each position of switch $S_1$, $S_2$, etc.

The number of times it will be necessary to run through the equations while making the adjustments just described, that is the number of cycles of operation required to reach the final answers, will vary with different equations. Some equations converge rapidly to the ultimate answers while other equations converge relatively slowly. A numerical example showing the way in which solutions are made on the computer is given as follows, wherein Equations 6, 7, and 8 are the same as Equations 3, 4, and 5 respectively, but with specific numbers for the known values:

Let the set of equations to be solved be:

$$2.0000X + .0390Y + .0086Z = .0602 \quad (6)$$
$$0X + 3.0000Y + .1428Z = 1.2543 \quad (7)$$
$$1.0000X + .6341Y + .1512Z = .3565 \quad (8)$$

In order to reduce all quantities to unity or less, the first equation may be divided by 2, the second by 3, and the third by 1. These operations give a modified set of equations, which, however, are satisfied by the same set of X, Y and Z values as the original set.

$$1.0000X + .0195Y + .0043Z = .0301 \quad (9)$$
$$0X + 1.0000Y + .0476Z = .4181 \quad (10)$$
$$1.0000X + .6341Y + .1512Z = .3565 \quad (11)$$

The following table summarizes the operation of the computer in solving these equations. The first column gives the number of the cycle of operation, one cycle being defined as the process of solving each of the equations once in the manner previously indicated. The second column gives the number of the equation being solved, and the next four columns show the values of the A and P coefficients corresponding to the particular equation (the letter $n$ representing the first digit in the subscript of the A or P quantity). The last three columns give the X, Y and Z approximations existing at that particular point in the operation, and the X, Y or Z which is solved for is underlined. It shall be noted that in this example, the solutions were initiated by arbitrarily setting the Y and Z potentiometers at zero and then solving for X. Any arbitrary initial values of Y and Z could, of course, have been used.

| Cycle of Operation | Equation being Solved | A Coefficients | | | | X, Y, Z Approximations | | |
|---|---|---|---|---|---|---|---|---|
| | | $A_n^1$ | $A_n^2$ | $A_n^3$ | $P_n$ | X | Y | Z |
| 1 | (9) | 1.0000 | .0195 | .0043 | .0301 | <u>.0301</u> | 0 | 0 |
| | (10) | 0 | 1.0000 | .0476 | .4181 | .0301 | <u>.4181</u> | 0 |
| | (11) | 1.0000 | .6341 | .1512 | .3565 | .0301 | .4181 | <u>.4090</u> |
| 2 | (9) | 1.0000 | .0195 | .0043 | .0301 | <u>.0200</u> | .4181 | .4090 |
| | (10) | 0 | 1.0000 | .0476 | .4181 | .0200 | <u>.3986</u> | .4090 |
| | (11) | 1.0000 | .6341 | .1512 | .3565 | .0200 | .3986 | <u>.5564</u> |
| 3 | (9) | 1.0000 | .0195 | .0043 | .0301 | <u>.0200</u> | .3986 | .5564 |
| | (10) | 0 | 1.0000 | .0476 | .4181 | .0200 | <u>.3916</u> | .5564 |
| | (11) | 1.0000 | .6341 | .1512 | .3565 | .0200 | .3916 | <u>.5866</u> |
| 4 | (9) | 1.0000 | .0195 | .0043 | .0301 | <u>.0200</u> | .3916 | .5866 |
| | (10) | 0 | 1.0000 | .0476 | .4181 | .0200 | <u>.3900</u> | .5866 |
| | (11) | 1.0000 | .6341 | .1512 | .3565 | .0200 | .3900 | <u>.5900</u> |

In this particular problem, four cycles of operation were required to reach the final answers which are:

$$X = .0200;$$
$$Y = .3900, \text{ and}$$
$$Z = .5900$$

In the foregoing problem, the A and P values set up on the computer are voltage ratios; that is, the coefficient 1.0000 for the $A_{n1}$ value in Equation 9 means that the tap $h$ is set at the top of potentiometer 11 so as to tap off the entire voltage across the potentiometer. The .0195 value for $A_{n2}$ means that tap $i$ is set to tap off .0195 of the total voltage across potentiometer 12, etc. The final solution .0200 for X was found by ascertaining that after the final cycle of operation, tap $c$ was set on potentiometer 6 to tap off .0200 of the total voltage across potentiometer 5, etc.

The total impedances of the potentiometers and resistors are not critical. It has been found that the following set of values can conveniently be used, and preferably they are made to be as close as possible to a pure resistance.

| Potentiometer or Impedance No. | Value of Impedance |
|---|---|
| Potentiometers 5, 6, 23, 7, 14, 15, 24, 16, 25, 26, 27 and 28 | 1000 ohms each. |
| Potentiometers 3, 4, and 22 | Do. |
| Resistances $R_1$, $R_2$, $R_3$, $R_4$ | 500,000 ohms each. |
| Potentiometer 60 | 1000 ohms. |

It will be recognized that by my invention I have provided a simple system for solving mathematical equations and that only one source of voltage is needed to supply the entire system. Furthermore, only one potentiometer representing each unknown quantity is needed in my system.

My system is not limited to the particular embodiments shown, which are merely illustrative of particular applications. Other modifications may readily suggest themselves. For example, it would be possible to solve equations on a simplified form as illustrated in Fig. 5. This is the same as the system of Fig. 3 except that the potentiometers 14, 15 and 16 of Fig. 3 are omitted as well as the switches $S_1$, $S_2$ and $S_3$. In the arrangement of Fig. 5, all of the knowns for all of the equations are set up on potentiometers 5, 6 and 7. This is not as convenient an arrangement as that of Figs. 3 and 4 because it is necessary first to set the knowns for the first equation on potentiometers 5, 6 and 7; then adjust for a null, by adjusting one of the unknowns. Then the settings of potentiometers 5, 6 and 7 must be readjusted to conform with the values of the next of the equations; whereupon another null indication is obtained by adjustment of the next unknown. This resetting of the known potentiometers 5, 6 and 7 for each subsequent equation must be made after each adjustment to a null. In consequence of this necessity for readjusting the known potentiometers, it will be preferable usually to use the additional known value potentiometers as shown in Figs. 3 and 4.

Furthermore, it will be apparent that in the system of Fig. 5, the known and unknown potentiometer may be interchanged in their position in the system, for example, potentiometer 5 may be made to represent X values while potentiometer 3 may have the known coefficients of X set up on it; and potentiometer 6 may correspondingly be made to represent Y values while the known coefficients of the Y's are set up on potentiometer 4.

Although the system is shown operating on alternating current, it will be understood that direct current could be substituted if desired.

My computing system will solve for many sets of equations so long as the solutions are convergent; that is, so long as each adjustment to a null point on the indicator brings the value of the unknown closer to its ultimate solution. Negative numbers may be conveniently handled by switching the corresponding potentiometer across opposite sides of the source voltage.

I claim:

1. Apparatus for solving linear simultaneous equations comprising a plurality of groups of potentiometers, each potentiometer being adapted to have a voltage across it and having an adjustable tap for selecting a portion of the voltage across the potentiometer, the potentiometers of each group being connected in parallel, a separate switching means associated with each group for selecting any desired one of the taps of the group, each of the groups having associated with it an individual potentiometer one end of which is connected with one side of the parallel arranged potentiometers of the group and the other end of which is connected with the associated switching means, an adjustable tap on each of said individual potentiometers, and means for adding the voltages between the tap of each individual potentiometer and one of its sides.

2. A computer for solving the unknown components in a plurality of linear simultaneous algebraic equations having additive quantities at least some of which consist of a known component multiplied by an unknown component, said computer comprising at least as many adjustable-tap potentiometers connected in parallel across a voltage source as there are additive quantities in an equation, each of said potentiometers representing a known component of the corresponding additive quantity, each of the potentiometers having tapped off from its adjustable tap a portion of its total voltage and having an additional adjustable tap potentiometer representing the corresponding unknown component connected across its tapped-off portion, the voltage at the tap of each of said additional potentiometers being the final voltage representing the respective additive quantity, each of the potentiometers whose tap represents the final voltage of an additive quantity having one of its terminals connected at a common point and means for adding the voltages representing the additive quantities, said means comprising a resistance in series between each flinal voltage tap and a common junction, and means for indicating null voltage between the common junction and the common point of the potentiometers.

3. A computer for solving for the unknown components in a plurality of linear simultaneous algebraic equations having additive quantities at least some of which consist of a known component multiplied by an unknown component, said computer comprising a single voltage source, a potentiometer combination corresponding to each additive quantity in an equation, each potentiometer combination which corresponds to the product of a known component and an unknown component comprising a first and a second adjustable-tap potentiometer, the first of which has its terminals connected to the voltage source, and the second of which has its terminals connected between the tap and a terminal of the first, and having its own tap represent the corresponding multiplied quantity, each potentiometer combination which corresponds to a known additive quantity comprising an adjustable-tap potentiometer having its terminals connected to the voltage source and having its tap represent the known quantity, one terminal of each potentiometer whose tap represents an additive quantity being connected to a common point, and means for adding the voltages at the taps of the last-mentioned potentiometers according to the summation of the equations.

4. A computer for solving for the unknown components in a plurality of simultaneous equations having additive quantities at least some of which consist of a known component multiplied by an unknown component, said computer comprising a single voltage source, a plurality of adjustable-tap type potentiometers connected across the voltage source, the ratio of the tapped off voltage to the total voltage across each potentiometer representing an individual one of the known components, each potentiometer representing a known component which is multiplied in an equation by an unknown component having connected across its tapped off voltage an additional adjustable-tap potentiometer the ratio of whose tapped off voltage to its total voltage represents the unknown component, one terminal of each potentiometer whose tap represents an additive quantity in an equation being connected to a common point and means for adding the voltages at the taps of the last-mentioned potentiometers according to the summation of equations.

5. A computer according to claim 4 in which means are associated with each of the potentiometers for ascertaining the ratio of the tapped off voltage to the total voltage across the potentiometer.

6. Apparatus for solving linear simultaneous algebraic equations, each equation containing the same number of additive quantities containing known values and at least some of the additive quantities containing unknown values to be ascertained, comprising groups of parallel-connected adjustable-tap voltage dividers corresponding to the known values of each additive quantity of the equations a voltage source connected across the groups of parallel-connected adjustable-tap voltage dividers, the number of voltage dividers in each group corresponding to the number of equations, a variable-tap voltage divider corresponding to each unknown value, means for successively connecting the tapped-off voltage of each parallel-connected voltage divider of each group having a known value across the corresponding one of the voltage dividers corresponding to an unknown value whereby the voltage of the tap of the latter is the tapped-off voltage of its group, an electrical voltage addition system for adding the voltages tapped off in each group comprising a separate impedance corresponding to each group, one end of each impedance being connected to the respective tapped off voltage of the respective group and the other ends of the several impedances being connected to a common connection, all of said impedances being of equal value, and an indicator for indicating when the sum of the added voltages is zero connected to measure the voltage at the point of common connection of the impedances.

7. Apparatus for solving linear simultaneous algebraic equations, each equation containing the same number of additive quantities containing known values and at least some of the additive quantities containing unknown values to be ascertained, comprising groups of parallel-connected adjustable-tap voltage dividers corresponding to the known values of each additive quantity of the equations, a source of alternating voltage being applied across all of the voltage dividers of the groups, means for applying the alternating voltage to groups representing negative quantities 180° out of phase with the voltage applied across the voltage dividers of the other groups, the number of voltage dividers in each group corresponding to the number of equations, a variable-tap voltage divider corresponding to each unknown value, means for successively connecting the tapped-off voltage of each parallel-connected voltage divider of each group having a known value across the corresponding one of the voltage dividers corresponding to an unknown value whereby the voltage of the tap of the latter is the tapped-off voltage of its group, an electrical voltage addition system for adding the voltages tapped off in each group, and an indicator for indicating when the sum of the added voltages is zero.

8. A computer for solving for the unknown components in a plurality of linear simultaneous algebraic equations having additive quantities at least some of which consist of a known component multiplied by an unknown component, said computer comprising a voltage source, a potentiometer combination corresponding to each additive quantity in an equation, each potentiometer combination which corresponds to the product of a known component and an unknown component comprising a first and a second adjustable-tap potentiometer, the first of which has its terminals connected to the voltage source, and the second of which has its terminals connected between the tap and a terminal of the first, and having its own tap represent the corresponding multiplied quantity, each potentiometer combination which corresponds to a known additive quantity comprising an adjustable-tap potentiometer having its terminals connected to the voltage source and having its tap represent the known quantity, one terminal of each potentiometer whose tap represents an additive quantity being connected to a common point, and means for adding the voltages at the taps of the last mentioned potentiometers comprising an individual impedance element having one of its terminals connected in series with the tap of each potentiometer representing an additive quantity, the other terminal of each impedance element being connected to a common junction, and means for indicating null voltage between the common point and the common junction.

9. A computer for solving for the unknown components in a plurality of linear simultaneous algebraic equations having additive quantities at least some of which consist of a known component multiplied by an unknown component, said computer comprising a voltage source, a potentiometer combination corresponding to each additive quantity in an equation, each potentiometer combination which corresponds to the product of a known component and an unknown component comprising a first and a second adjustable-tap potentiometer, the first of which has its terminals connected to the voltage source, and the second of which has its terminals connected between the tap and a terminal of the first, and having its own tap represent the corresponding multiplied quantity, each potentiometer combination which corresponds to a known additive quantity comprising an adjustable-tap potentiometer having its terminals connected to the voltage source and having its tap represent the known quantity, one terminal of each potentiometer whose tap represents an additive quantity being connected to a common point, and means for adding the voltages at the taps of the last mentioned potentiometers according to the summation of the equations comprising an individual impedance element in series with the tap of each potentiometer representing an additive quantity, the terminals of each impedance element remote from its tap being connected to a common junction, the impedance of the potentiometers to which the impedance elements are connected being negligible in comparison with the impedance of said impedance elements.

10. Apparatus for effecting solution of a plurality of linear simultaneous algebraic equations containing additive quantities at least some of which contain unknowns to be ascertained, comprising a source of voltage, groups of adjustable-tap voltage dividers, the number of said groups corresponding to the number of additive quantities of each equation and each group having its voltage dividers connected in parallel to each other and across said source of voltage, the number of said parallel voltage dividers in each group corresponding to the number of equations to be solved, a separate adjustable-tap voltage divider associated with each of said groups of parallel-connected voltage dividers and adapted to be connected successively across the tapped-off portion of each voltage divider of its associated group, an electrical voltage adding system for adding the voltage tapped off the several ones of said separate voltage dividers and an indicator for indicating when the sum of the added voltages is zero.

11. Apparatus for effecting solution of linear simultaneous algebraic equations, each equation containing the same number of additive quantities containing known values and at least some of the additive quantities containing unknown values to be ascertained, comprising groups of parallel-connected adjustable-tap voltage dividers, the number of said groups corresponding to the number of additive quantities of each equation and the number of voltage dividers in each group corresponding to the number of equations, a single voltage source connected across all of the parallel-connected voltage dividers of all the groups, a separate adjustable-tap voltage divider associated with each of said groups and corresponding to each unknown value, means for successively connecting the tapped off voltage of each parallel-connected voltage divider of each group having a known value across the corresponding one of the voltage dividers corresponding to an unknown value whereby the voltage of the tap of the latter is the tapped-off voltage of its group, an electrical voltage addition system for adding the tapped-off voltages of the several groups, and an indicator for indicating when the sum of the added voltages is zero.

12. Apparatus according to claim 11 in which the single voltage source is a source of alternating current voltage.

CLIFFORD E. BERRY.

REFERENCES CITED

The following references are of record in the file of this patent:

UNITED STATES PATENTS

| Number | Name | Date |
|---|---|---|
| 1,655,276 | Lichtscheindl | Jan. 3, 1928 |
| 1,893,009 | Ward | Jan. 3, 1933 |
| 2,087,667 | Hedin | July 20, 1937 |
| 2,258,859 | Mitelman | Oct. 14, 1941 |
| 2,401,779 | Swartzel | June 11, 1946 |
| 2,408,081 | Lovell | Sept. 24, 1946 |
| 2,446,191 | Pemberton | Aug. 3, 1948 |
| 2,454,549 | Brown | Nov. 23, 1948 |
| 2,455,974 | Brown | Dec. 14, 1948 |
| 2,459,106 | Hardy | Jan. 3, 1949 |
| 2,468,150 | Wilcox | Apr. 26, 1949 |
| 2,469,627 | Bowman | May 10, 1949 |